United States Patent [19]
Wooler et al.

[11] 4,249,949
[45] Feb. 10, 1981

[54] METHODS FOR CONSOLIDATING RADIOACTIVE WASTE MATERIAL USING SELF-SETTING OR WATER-SETTABLE COMPOSITIONS CONTAINING AN ORGANIC POLYISOCYANATE, A NON-IONIC SURFACE ACTIVE AGENT DEVOID OF ISOCYANATE-REACTIVE GROUPS AND ALKALINE FILLER

[75] Inventors: Alan M. Wooler, Manchester, England; Olle Bengtson, Gothenburg, Sweden

[73] Assignee: Imperial Chemical Industries Limited, London, England

[21] Appl. No.: 38,709

[22] Filed: May 14, 1979

[30] Foreign Application Priority Data

May 18, 1978 [GB] United Kingdom ............... 20430/78

[51] Int. Cl.³ .............................................. G21F 9/00
[52] U.S. Cl. ........................................ 106/90; 106/98; 106/99; 252/301.1 W; 260/2.3; 260/29.2 TN
[58] Field of Search ............................ 106/90, 98, 99; 260/2.3, 29.2 TN; 252/301.1 W

[56] References Cited

U.S. PATENT DOCUMENTS

| 2,902,388 | 9/1959 | Szukiewicz | 260/40 TN |
| 2,954,301 | 9/1960 | Szukiewicz | 427/136 |
| 3,977,889 | 8/1976 | Shearing | 260/29.2 TN |
| 3,996,154 | 12/1976 | Johnson et al. | 260/2.3 |
| 4,127,548 | 11/1978 | Alexander | 260/29.2 TN |

FOREIGN PATENT DOCUMENTS 1342063 12/1973 United Kingdom .
1417618 12/1975 United Kingdom .
1444933 8/1976 United Kingdom .
1488020 10/1977 United Kingdom .

Primary Examiner—Maurice J. Welsh
Attorney, Agent, or Firm—Cushman, Darby & Cushman

[57] ABSTRACT

Self-setting compositions are formed by bringing into admixture an organic polyisocyanate, a non-ionic surface active agent devoid of isocyanate-reactive groups, an alkaline filler and water. Preferred alkaline fillers are portland cement, calcium oxide and hydrated lime. A plasticizer is preferably incorporated in the composition. Waste material, for example liquid or particulate radioactive wastes may be formed into a self-setting composition for consolidation and disposal. A particulate extender may be incorporated in the self-setting composition to give a product useful for example as a floor screed or cavity filler.

8 Claims, No Drawings

METHODS FOR CONSOLIDATING RADIOACTIVE WASTE MATERIAL USING SELF-SETTING OR WATER-SETTABLE COMPOSITIONS CONTAINING AN ORGANIC POLYISOCYANATE, A NON-IONIC SURFACE ACTIVE AGENT DEVOID OF ISOCYANATE-REACTIVE GROUPS AND ALKALINE FILLER

This invention relates to isocyanate compositions and in particular to self-setting or water-settable isocyanate compositions, to methods of formation of self-setting compositions and to methods of consolidating a waste material.

According to the present invention there is provided a method of forming a self-setting composition which comprises bringing into admixture an organic polyisocyanate; a non-ionic surface active agent devoid of isocyanate-reactive groups; an alkaline filler; and water.

The present invention includes within its scope self-setting compositions formed by the above method.

The self-setting compositions of the present invention are applied in admixture with water and thereafter harden or set with the absorption of water to form a rigid body.

The self-setting composition may be formed in a variety of ways. For example the organic polyisocyanate may be emulsified with water in the presence of the non-ionic surface active agent (as described for example in our United Kingdom Pat. No. 1,444,933), and the alkaline filler may be added to this emulsion. There are advantages however in providing a water-settable composition which is water-free and can be stored until required. The water-settable composition then forms a self-setting composition on the addition of water or of water containing appropriate adjuvants.

Thus according to a further aspect of the present invention there is provided a water-settable composition comprising an organic polyisocyanate; a non-ionic surface active agent devoid of isocyanate-reactive groups; and an alkaline filler.

Preferably the water-settable composition is an intimate admixture comprising the isocyanate, the surface active agent and the alkaline filler. The admixture can then be contained in a single pack whose contents can be mixed into water to form the self-setting composition. However it is also envisaged that the water-settable composition may be contained in a plurality of packs, for example two packs comprising respectively (a) the isocyanate and surface active agent and (b) the alkaline filler. Both packs are then added to the water or water containing suitable additives to form the self-setting composition.

Organic polyisocyanates which may be used include diisocyanates and higher functionality isocyanates, particularly aromatic polyisocyanates. Mixtures of polyisocyanates may be used, for example a mixture of tolylene diisocyanate isomers such as commercially available mixtures of 2,4- and 2,6-isomers. Tolylene diisocyanates do however give rise to toxic fumes even at normal temperature and may therefore be unsuitable in some situations. The non-volatile "TDI still residues" are generally more acceptable to handle, but better still are the mixtures of di- and higher functionality polyisocyanates produced by phosgenation of aniline/formaldehyde condensates. Such mixtures are well known in the art and include the crude phosgenation products containing mixtures of methylene bridged polyphenyl polyisocyanates including diisocyanates, triisocyanates and higher functionality polyisocyanates together with any phosgenation by-products. These crude phosgenation products are referred to as crude MDI.

Other suitable organic polyisocyanates include isocyanate-ended prepolymers made by reaction of an excess of a diisocyanate or higher functionality polyisocyanate with a hydroxyl-ended polyester or polyether and products obtained by reacting an excess of diisocyanate or higher functionality polyisocyanate with a monomeric polyol or mixture of monomeric polyols such as ethylene glycol, trimethylolpropane or butane-diol.

Preferred isocyanate-ended prepolymers include for example the products obtained by reacting an excess of crude MDI with oxypropylated ethylene glycol, with oxypropylated glycerol and with castor oil.

Suitable non-ionic surface active agents are the reaction products of diisocyanate and higher functionality polyisocyanates with monoalkyl ethers of polyethylene glycol as described in United Kingdom Pat. No. 1,417,618. These emulsifying agents have the formula:

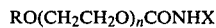

$$RO(CH_2CH_2O)_n CONHX$$

where R is an alkyl group of from 1 to 4 1 carbon atoms; n is an integer such that the compound contains an average of from 5 to 120, preferably 10 to 25 oxyethylene groups; and X is the residue of a polyisocyanate and contains at least one free isocyanate group. They are prepared by reacting a polyethenoxy alcohol of the formula:

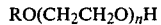

$$RO(CH_2CH_2O)_n H$$

with a polyisocyanate, there being used at least one molar proportion of isocyanate for each molar proportion of the alcohol. Preferably an excess of the isocyanate is used. The reaction is carried out by adding the alcohol to the isocyanate with stirring until clear and allowing the reaction to proceed at a temperature of up to 100° C. or, if the isocyanate is an isocyanate-ended prepolymer, up to 70° C.

The amount of agent used will usually be from 1 to 15 parts by weight, preferably 3 to 8 parts by weight, based on 100 parts by weight of the isocyanate. If an isocyanate-ended prepolymer is used, the emulsifying agent can be added before, during or after formation of the prepolymer.

The emulsifying agent may be prepared in situ in the polyisocyanate. In this case X is the residue of the isocyanate used in the binding agent. If an isocyanate-ended prepolymer is used the polyethenoxy alcohol can be added to form the emulsifying agent before, during or after formation of the prepolymer.

Examples of the polyethenoxy alcohols which can be used in preparing the emulsifying agents are methoxypolyethylene glycols of molecular weight of 300 to 1000. Thus an especially preferred non-ionic surface active agent for use for example with crude MDI is the reaction product of crude MDI with a methoxypolyethylene glycol of the molecular weight 300 to 1000.

The alkaline filler is suitably an alkaline solid which is insoluble in water or which has a low solubility in water such that the self-setting capacity of the composition is not impaired. Examples of suitable alkaline fillers include hydraulic cements and alkaline earth metal oxides. Especially preferred alkaline fillers are portland cement, calcium oxide and mixtures thereof.

When the alkaline filler is incorporated in a single pack water-settable composition, it is preferably dried before incorporation, since otherwise water adsorbed by the alkaline filler from the atmosphere may be sufficient to initiate a partial setting of the composition. For the same reason the single pack water-free, self-settable composition is preferably stored in an air-tight container. However, if the alkaline filler is incorporated as a multi-pack system or directly into a self-setting composition for example by addition to an aqueous emulsion of the organic polyisocyanate containing the surface active agent, the dryness of the filler is less important. Thus it is even possible for example to use hydrated lime rather than calcium oxide. However it must be remembered that all such water absorbed by the filler adds to the total water present in the system.

The amount of alkaline filler used may be varied widely depending on the product required and may for example be from 25 to 500 parts by weight of alkaline filler per 100 parts by weight of the isocyanate.

The amount of water incorporated in the self-setting composition may be varied widely. Indeed, it is an advantage of the present invention that whilst the water-free system is strongly water absorbent and can form self-setting compositions with a minimum of water, it is nevertheless capable of accepting relatively large amounts of excess water without adversely effecting the self-setting properties. In general, therefore the amount of water incorporated in the self-setting composition or the amount of water added to the water-free self-settable composition is with the range 5 to 200 parts by weight of water per 100 parts by weight of isocyanate.

The aqueous self-setting composition or the water-settable composition preferably contains a plasticiser to reduce viscosity, improve workability and give a less brittle product. Examples of suitable plasticisers include butyl benzyl phthalate, chlorinated paraffins (for example those chlorinated paraffins commercially available from Imperial Chemical Industries Limited under the trademark "Cereclor"), tricresyl phosphate, tris(chloropropyl)phosphate and aromatic phosphates. The plasticiser is preferably present in the proportion of from 5 to 100 parts by weight per 100 parts by weight of isocyanate.

The method of forming a self-setting composition may be advantageously applied to the consolidation of waste material for disposal.

Thus according to a further aspect of the present invention there is provided a method of consolidating a waste material which comprises bringing the waste material into admixture with an organic polyisocyanate; a non-ionic surface active agent devoid of isocyanate-reactive groups; and an alkaline filler in the presence of water.

For example certain radioactive wastes may be disposed of in mines or at sea in lead-lined and cement encased drums. However, since the waste remains radioactive for a considerable number of years, it is desirable (as an added protection) to consolidate the radioactive material into a block so that should the drum become damaged in the course of time, the radioactive material will not leak out and become dispersed in the sea. The handling of the radioactive material and the formation of the block must take place by remote handling and under suitably shielded conditions. The compositions of the present invention are ideally suited to such processes.

Many of the radioactive wastes contain a high proportion of water. For example spent nuclear fuels are commonly stored under water, and this water is continuously circulated through ion exchange resins to remove radioactive ions such as Cs 137. The spent ion exchange resin, of which greater than half the weight in water, may be disposed of at sea as described above. Furthermore radioactive sludges which collect at the bottom of the storage ponds, and can be similarly disposed of, also contain considerable amounts of water so that predrying is not very practicable. Similarly, certain nuclear power stations use aqueous solutions (for example aqueous solutions of borax) as a moderator, and these liquid aqueous wastes may also be consolidated by the method of the present invention.

The compositions of the present invention are compatible with the large quantities of water present in such wet particulate radioactive wastes and aqueous liquid wastes and are therefore very suitable for consolidation of the waste into blocks. The water-free self-settable composition is especially convenient for this application since it can be simply stirred into the wet particulate radioactive waste (without the addition of further water), or into the aqueous liquid waste, without pre addition of any hardener or catalyst thus directly forming a self-setting composition which can be case into a block in a single process. Naturally a single stage process is well suited to remote handling conditions necessary for radioactive wastes.

In addition to the use of the water-settable compositions for the consolidation of radioactive wastes, the water-settable compositions may give products which are useful if their own right. Thus the aqueous self-setting composition or the water-free self-settable composition may for example contain a particulate extender whose nature depends on the function the composition is to perform once it is set. For example, sand or aggregate may be used for applications such as floor screeds or cavity filling (plastic padding). Sand generally has a particle size within the range 0.1–1.0 mm and aggregate a particle size of from 1 mm to 25 mm. If lower density compositions or compositions having a finer texture are required, a low density (less than 1 g/cc) or fine particle size (1 to 75 microns) extenders may be used. Examples of such low density extenders include glass microspheres, polystyrene foam, polyurethane foam, sawdust, woodflour and Vermiculite, power station fly ash, expanded clay and foamed slag. Examples of fine particle size extenders include mica, alumina, chalk, talc, silica and powdered slate, barytas and powdered and leafed metals.

Increased strength may generally be obtained by incorporating a fibrous extender in the composition. Examples of suitable fibrous extenders include asbestos, synthetic mineral fibres, synthetic metal oxide fibres, glass fibre, cotton, wool, polyamide fibre, polyester fibre, polyacrylonitrile fibre and chips and fibres from lignocellulosic materials. The fibrous filler should be sufficiently alkali-resistant to avoid excessive attack from the alkali binder. The staple length of the fibrous extender is preferably in the range 1 mm to 10 mm.

Whatever particulate extender is used, it may be incorporated in a variety of ways. Thus the extender may be brought into admixture together with the water, surface active agent, isocyanate and alkaline filler in the self-setting composition or (if it is water-free) it may be incorporated in the water-settable composition to which the water is subsequently added. An especially convenient method of incorporating the particulate extender is to wet the extender with the desired quantity of water and mix the water-settable composition with the wet extender to form a self-setting composition. In certain cases (as noted above for radioactive wastes) the extender may already be wet, and in this case it may be used as such.

The proportions of particulate extender may be varied widely but it is generally preferred to use not greater than 500 parts by weight of particulate extender per 100 parts by weight of isocyanate. By varying the proportions of the particulate extender (for example sand) and the alkaline filler, it is possible to obtain a composition which is flowing, trowellable, thixotropic or non-flowing as required.

It is normally convenient to form the self-setting composition (for example by the addition of water to the water-settable composition) at room temperature. However, higher or lower temperatures may be used and for specialist applications there may be advantages in forming the self-setting composition at an elevated temperature, for example a temperature of from 20° C. to 60° C. Similarly, there is normally no need to heat-cure the solid composition formed once initial set is achieved, but curing at elevated temperature may nevertheless provide advantages if a rapid cure is required. Even if curing takes place at room temperature, the composition may become warm as a result of reactions taking place during curing.

Organic polyisocyanates are water-reactive to form ureas with the evolution of carbon dioxide. The evolution of free carbon dioxide during the formation of the self-setting composition or whilst it is setting is highly undesirable since it leads to foaming and the formation of lower density products of poor strength. Whilst the scope of the present invention is not to be taken as limited by any one particular theory, it is believed that the evolution of free carbon dioxide is avoided, or at least minimised, firstly by the formation of an oil-in-water emulsion under the action of the surface active agent and secondly by the adsorption by the alkaline filler of any carbon dioxide which might be evolved.

The invention is illustrated by the following examples in which all parts and percentages are by weight unless otherwise stated.

EXAMPLE 1

To 100 parts of crude MDI were added 30 parts of oxypropylated glycerol of molecular weight 1000 and 10 parts of methoxy polyethylene glycol of molecular weight 650. The mixture was maintained at 60° C. and stirred for 18 hours to form a prepolymer of crude MDI containing a non-ionic surface active agent.

The prepolymer was then mixed with 60 parts of tris(chloropropyl)phosphate plasticiser and the product blended with 300 parts of dry Portland cement to give a water-settable composition which was a smooth thick fluid.

50 parts of water were added to the water-settable composition to give a self-setting composition suitable for pressing out, trowelling out, callendering or extrusion into a shaped product. The composition was cured at room temperature and after 1½ hours gave a hard solid showing no evidence of foaming. Full cure took a few days.

EXAMPLE 2

The water-settable composition prepared as in Example 1 (500 parts) was mixed with 450 parts of sand (50 mesh screened) wetted with 50 parts of water. The self-setting composition thus formed was suitable for pressing out, trowelling out, callendering or extrusion into a shaped product. The composition was cured at room temperature and after 3 hours gave a hard solid showing no evidence of foaming.

EXAMPLE 3

The water-settable composition prepared as Example 1 (500 parts) was mixed with 750 parts of ion exchange resin of a type typically used to remove radioactive ions from aqueous solution ('Amberlite' IR 105) available from Rhon and Haas—Amberlite is a trade mark) having 450 parts of water absorbed thereon. The self-setting composition thus formed was cast into a block which after curing at room temperature for 2 hours showed complete consolidation of the resin and was suitable for drumming and disposal.

EXAMPLE 4

The water-settable composition prepared as in Example 1 (500 parts) was mixed with 50 parts of glass fibre wetted with 50 parts of water. The self-setting composition thus formed was suitable for pressing out, trowelling out, callendering or extrusion into a shaped product. The composition was cured at room temperature and after 2 hours gave a hard solid showing no foaming.

EXAMPLE 5

To 100 parts of crude MDI were added 8 parts of methoxypolyethylene glycol of molecular weight 650. The mixture was stirred at 60° C. for 18 hours to form a crude MDI containing a surface active agent. To this was added 240 parts of dry Portland cement and 52 parts of glass fibre of mean diameter 13–14 Microns and staple length 6 mm. The resultant water-settable composition was stirred to disperse the cement and separate out any clumps of fibre; a stiff dough was thus formed.

To the stiff dough was added 60 parts of water which gave a less stiff dough having a whitish appearance characteristic of an oil-in-water emulsion. The dough was pressed out to form a sheet 3 mm thick and after 40 minutes was sufficiently cured that it could be demoulded using a wax release agent. The product was a tough rigid sheet free from signs of foaming.

EXAMPLE 6

A prepolymer was prepared by mixing together 100 parts crude MDI, 60 parts 'Cereclor' 50 LV ('Cereclor' is a trade mark) 30 parts oxypropylated ethylene glycol MW 1000 and 10 parts methoxy polyethylene glycol MW 650 and keeping at 50° C. for 24 hours. To this was then added 100 parts of dry finely powdered calcium oxide which was stirred to produce a thick but fluid dispersion. This "binder" was then admixed with 520 parts of Chelford 50 sand and saturated with 80 parts of water which on mixing gave a thick but fluid emulsion with a work time of about 15 minutes, setting to a hard solid in 3 hours.

EXAMPLE 7

The binder of Example 6 was admixed with 700 parts of a wet ion exchange resin ('Amberlite' IR 105 available from Rohm and Haas) containing 63% water. On stirring a thick but fluid dispersion was easily obtained which self set in about 15 minutes and hardened in about 2 hours, and was then suitable for drumming and disposal.

EXAMPLE 8

The procedure of Example 7 was repeated but replacing the Cereclor with a triaryl phosphate (Reofos 95 available from Ciba Geigy). A similar result was obtained but with a somewhat faster setting time of about 10 minutes.

EXAMPLE 9

The procedure of Example 7 was repeated but replacing the Cereclor with trichlorpropyl phosphate (Daltogard F) which gave a still faster setting time of about 5 minutes.

EXAMPLE 10

200 parts of prepolymer prepared as in Example 6 was admixed with 100 parts dry powdered slaked lime ('Limbux' - 'Limbux' is a trademark of Imperial Chemical Industries Limited) and 700 parts of wet building sand was added. The mix was a non fluid paste which could be trowelled on a vertical surface and which hardened in about ½ hour being well set in 2 hours.

EXAMPLE 11

A prepolymer was prepared by mixing 100 parts crude MDI with 30 parts Castor oil, 10 parts methoxypolyethylene glycol MW 650 and 60 parts trichlorpropylphosphate and stirring until mixed whilst heating to 60° C. and maintaining at this temperature for 18 hours. The resultant cooled viscous liquid was then mixed with 300 parts of dry portland cement to give a viscous mix which, when required for use, was admixed with water in a proportion corresponding to at least 50 parts, giving a fluid emulsion which solidified to a hard glossy solid in about ½ hour, hardening further on ageing and displaying excellent adhesion to many surfaces which might themselves be damp.

EXAMPLE 12

To 100 parts of crude MDI were added 30 parts of oxypropylated ethylene glycol of molecular weight 1000 and 10 parts of methoxy polyethylene glycol of molecular weight 650. The mixture was maintained at 80° C. and stirred for 2 hours to form a pre-polymer of crude MDI containing a non-ionic surface active agent.

41 parts of a typical reactor modifier solution containing 120 gms of boric acid and 40 gms of caustic soda per liter of water were premixed with 39 parts of dry calcium oxide powder to form a slurry. To this slurry were added 20 parts of the pre-polymer of crude MDI containing the non-ionic surface active agent, and on stirring a fluid mix was obtained which hardened within one hour to a white solid. The white solid was suitable for drumming and disposal

We claim:

1. A method of consolidating a radioactive waste material which comprises bringing the radioactive waste material into admixture with an organic polyisocyanate; a non-ionic surface active agent devoid of isocyanate-reactive groups; and an alkaline filler in the presence of water.

2. A method according to claim 1 wherein the waste material is a wet particulate waste.

3. A method according to claim 1 wherein the waste material is a liquid aqueous waste.

4. A method according to claim 1 wherein the alkaline filler is portland cement, calcium oxide, or hydrated lime.

5. A method according to claim 1 wherein there is additionally incorporated a plasticiser.

6. A method according to claim 1 wherein there is additionally incorporated a particulate extender.

7. A method according to claim 1 wherein the organic polyisocyanate is crude MDI or an isocyanate-ended prepolymer thereof.

8. A method according to claim 1 wherein the non-ionic surface active agent has the formula:

$$RO(CH_2CH_2O)_n CONHX$$

wherein R is an alkyl group of from 1 to 4 carbon atoms; n is an integer such that the compound contains an average of from 5 to 120 oxyethylene groups; and X is the residue of a polyisocyanate and contains at least one free isocyanate group.

* * * * *